Oct. 11, 1932.  S. MEZZAPESA  1,882,226
COFFEE MAKING MACHINE
Filed Sept. 15, 1930    2 Sheets-Sheet 1
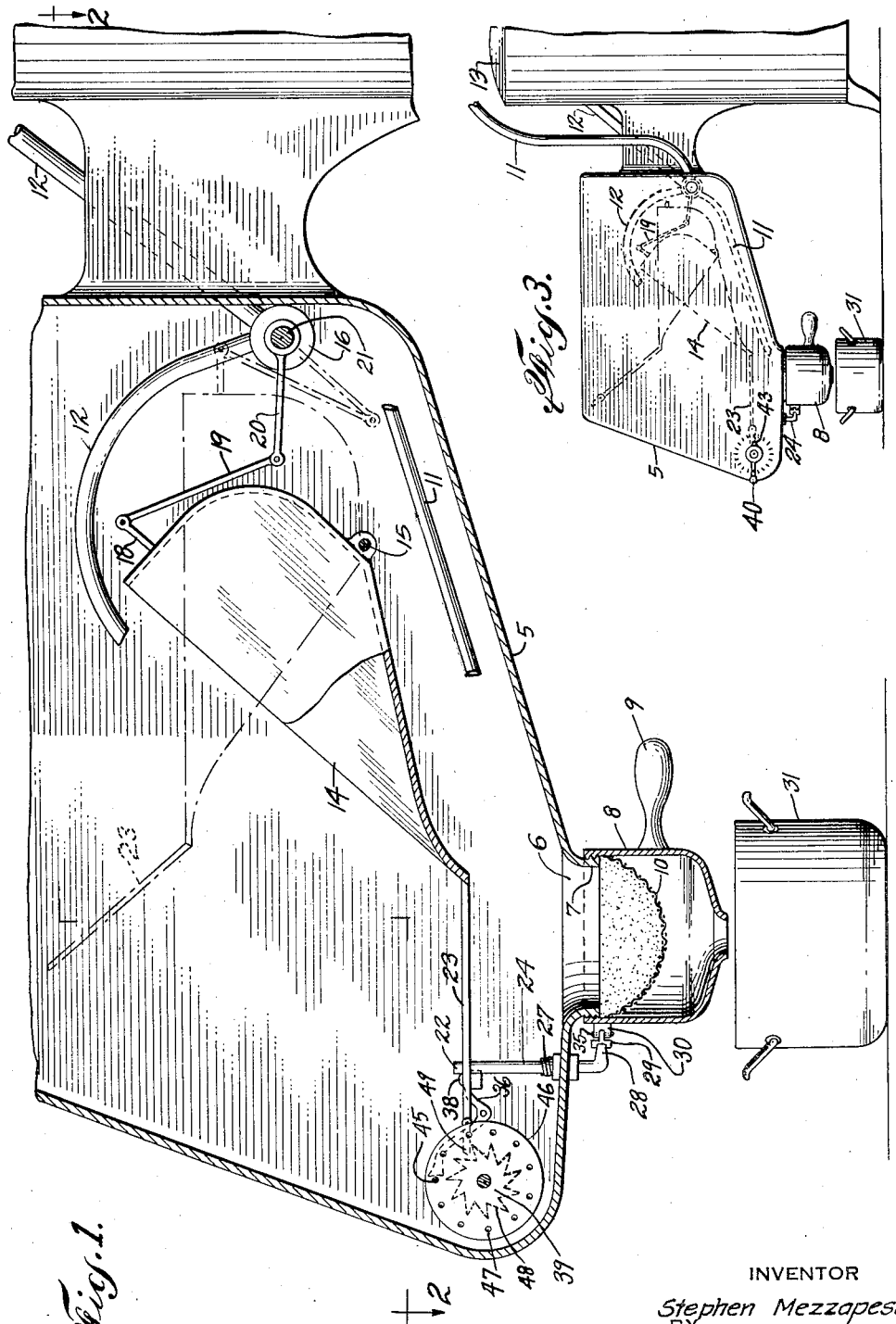
INVENTOR
Stephen Mezzapesa.
BY
Emanuel Scheyer.
ATTORNEY Oct. 11, 1932.  S. MEZZAPESA  1,882,226
COFFEE MAKING MACHINE
Filed Sept. 15, 1930   2 Sheets-Sheet 2
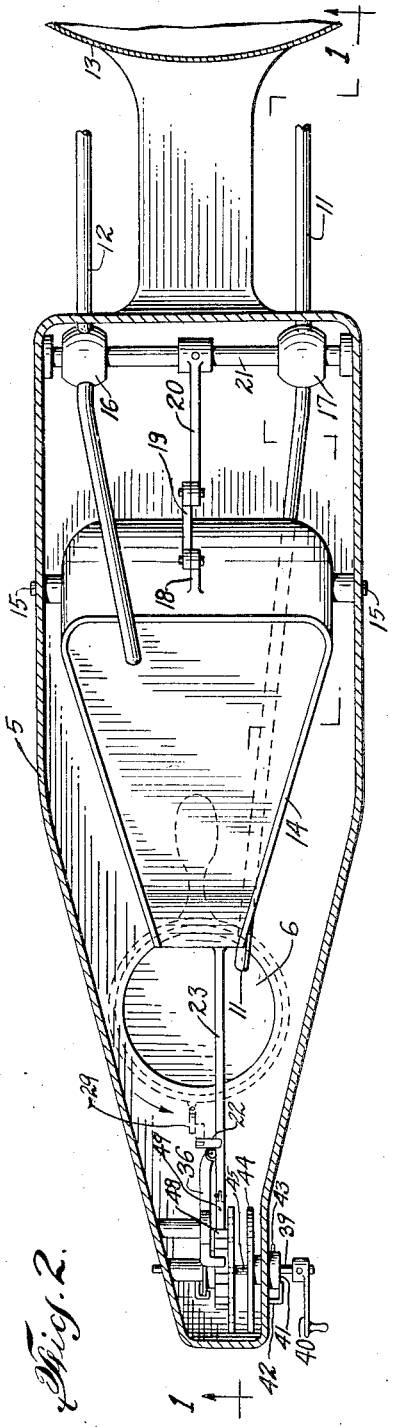
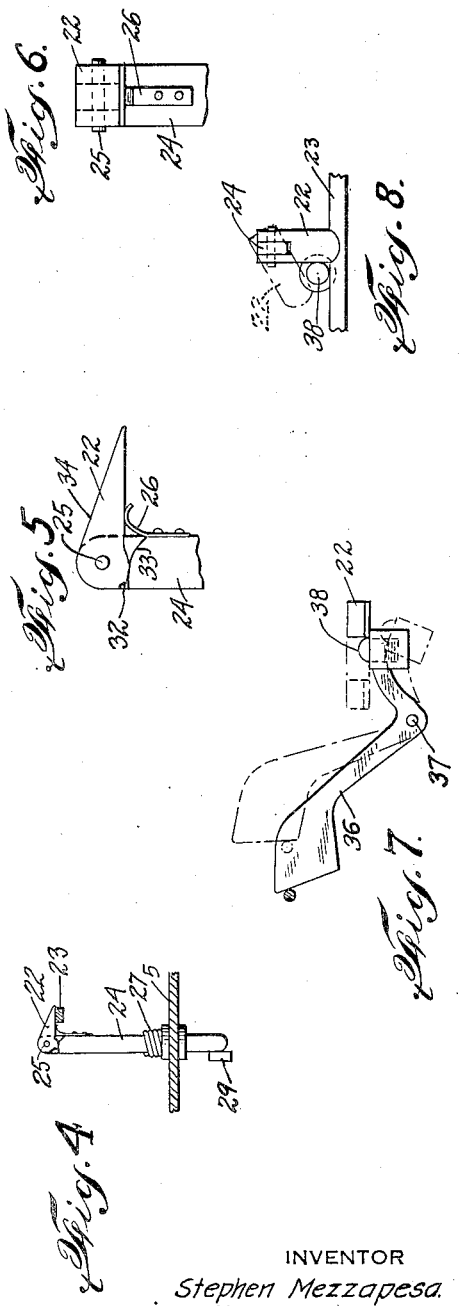
INVENTOR
Stephen Mezzapesa.
BY
Emanuel Scheyer.
ATTORNEY Patented Oct. 11, 1932

1,882,226

UNITED STATES PATENT OFFICE

STEPHEN MEZZAPESA, OF NEW YORK, N. Y.

COFFEE MAKING MACHINE

Application filed September 15, 1930. Serial No. 481,818.

This invention relates to a machine for automatically making various predetermined numbers of batches of coffee. It can be used to make an individual cup of coffee or coffee in large quantities. In the latter case the device is of larger size than the individual cup type, but need not be as large as present machines, because the coffee is made in batches instead of all at once. Let us say, by way of example, the capacity of the machine is one-half gallon at a time, therefore if two gallons are required the machine automatically goes through its operations four times in succession and then automatically comes to a stop.

A particular advantage of my machine is that the coffee is always freshly made. Unlike most of the present machines in use, no coffee is stored in the machine waiting to be used. The machine is only started in its operation when the container holding the coffee grounds is put in place on the machine. The placing of the container in position on the bottom of the machine sets off a train of operations which causes hot water and steam to be introduced into the interior of the machine. Inside the machine a hopper, for catching the water as it is introduced, is pivotally mounted, normally being held by gravity in a substantially horizontal position. As the water fills the hopper, after a certain amount is introduced, the effect of gravity of the hopper by itself for holding it in normal position is overcome and the hopper is tilted downward discharging its water upon the coffee grounds held in the container. This produces one batch of coffee. When the hopper is emptied, gravity returns it to its normal position and more hot water is automatically introduced repeating the process again for another batch. This keeps on repeating until it is stopped by mechanism which is provided to control the number of batches. Said mechanism can be set by hand in accordance with the number of batches desired at any time.

The device can also be used for the dispensing of other liquids than coffee, as for example milk, in which case the coffee grounds will not be present in the container.

Other objects and advantages will become apparent upon further study of the description and drawings in which:—

Fig. 1 is a partial vertical section of the machine taken along the broken line 1—1 of Fig. 2.

Fig. 2 is a sectional plan taken along the broken line 2—2 of Fig. 1.

Fig. 3 is a side elevation of the machine showing it attached to a hot water boiler.

Fig. 4 is a detail of the latch rod.

Fig. 5 is a large scale detail of the catch at the top of the latch rod.

Fig. 6 is a view of the catch taken at right angles from Fig. 5.

Fig. 7 is an enlarged view of the lever for controlling the number of batches in relation to certain other cooperating parts, the hopper finger being omitted for clarity.

Fig. 8 is an enlarged plan view of the catch at the top of the latch rod in its relation to other cooperating parts.

A casing 5 forms a closed vessel except for the opening 6 at its bottom. Opening 6 is provided with an externally threaded flange 7, upon which is screwed a container 8 having a handle 9. Fitting inside of container 8 is a strainer 10 in which the coffee grounds are placed. Container 8 is open at the bottom for the discharge of the coffee into the cup or other vessel 31.

Steam is introduced into casing 5 by means of steam pipe 11 which is connected to a source of steam. Hot water is introduced by means of pipe 12 which is connected to a hot water boiler 13.

Pivotally mounted in casing 5 is a hopper 14 pivoted at 15. When hot water is flowing through pipe 12 it drops into hopper 14. When said hopper is empty, it normally assumes (due to gravity) the position shown by the dotted lines in Fig. 1. When hopper 14 is filled with water it assumes the position shown by the full lines.

When hopper 14 is in the position shown by the full lines, the hot water and steam supply are cut off and remain so as long as the hopper is tilted down.

Valves 16 and 17, which are operated by hopper 14 control the supply of water and steam. An arm 18 projects from the rear of hopper 14. Link 19 is pin connected at one end to arm 18 and at the other end to arm 20 fixed to valve rod 21. When hopper 14 is tilted down, this linkage turns valve rod 21 to shut off the valves, whereas the linkage opens the valves when hopper 14 is in its upper position.

When hopper 14 drops, after being filled with water, (that is after it receives enough water to tilt it) to its down position, a catch 22, if it be in the position shown in Figs. 1, 2 and 4 holds it down. Hopper 14 has a finger or projection 23 which engages with catch 22. Catch 22 is pivotally mounted at the top of latch rod 24. The action of rod 24 and the mechanism controlling its position will be explained later on. Catch 22 is pivoted on a pin 25 and normally held in the horizontal position by plate spring 26 (Fig. 5), a shoulder 32 formed on the catch limiting the upward action of spring 26 by its contact with the surface 33 formed in latch rod 24. In action catch 22 may be depressed downwardly from its horizontal position as finger 23 comes down against inclined face 34, but it cannot be raised above its horizontal position. Once finger 23 gets under catch 22, said finger is prevented from rising.

Rod 24 is rotatably mounted in the wall of casing 5 being normally held in the position shown in Figs. 1 and 2 by torsion spring 27. The lower end of rod 24 is provided with a right angle projection 28. As container 8 is screwed into position on flange 7, a catch 29 is pushed against projection 28, rotating rod 24 and dislodging catch 22 from on top of finger 23. Catch 29 is pivotally mounted on lug 30 formed on container 8, the pivot pin being at 35 (Fig. 2). Catch 29 is normally spring held in the position shown in Fig. 2. Said catch is similar in mounting and action to catch 22 previously described. When container 8 is rotated in the direction of the arrow in Fig. 2, catch 29 holds stiff and pushes projection 28. Catch 29 is free to rotate in the opposite direction from the holding direction just described, so that when container 8 is unscrewed from the casing, the hopper is not released for its upper position by the rotation of catch 22 and rod 24.

Normally when rod 24 is rotated by catch 29 so as to remove catch 22 from on top of finger 23, spring 27 would return it to its initial position (position of Fig. 2). Catch 22 would then be in readiness again to enter into locking engagement with finger 23 as soon as hopper 14 came down again when filled with hot water from pipe 12. Mechanism will now be described to prevent the return of catch 22 and the rotation of rod 24 until a predetermined number of batches of hot water have been dumped by hopper 14, that is until hopper 14 has tilted a predetermined number of times.

Lever 36 is fixed to pin 37 which is rotatably mounted on casing 5 and normally spring held in the position shown in Fig. 1. (The spring is not shown.) The shorter arm of lever 36 is provided with a hemispherical top 38. When rod 24 is rotated by catch 29, as the container 8 is screwed on casing 5, it will cause catch 22 to ride over top 38 by depressing the shorter arm of lever 36. Once catch 22 is on the other side of top 38, as shown by dotted lines in Figs. 7 and 8, it is held there by the latter, until lever 36 is rotated to lower top 38 as shown in dotted lines in Fig. 7. Lever 36 is rotated when the predetermined number of batches have been delivered in accordance with the following mechanism.

Shaft 39 is rotatably and slidably mounted upon casing 5. Fixed to one end of said shaft is setting arm 40. Feathered to shaft 39 is collar 41 held against longitudinal motion on one side by the wall of casing 5 and on the other by lug 42. Collar 41 rotates with shaft 39 but permits the latter to slide through it. Collar 41 carries a pointer 43, which is rotatable in front of a scale indicating the number of batches obtainable for each setting of the pointer (Fig. 3). Fixed to shaft 39 just inside of casing 5 is a disc 44 carrying a pin 45. Another disc 46 provided with setting holes 47 is loosely mounted on shaft 39. Fixed to disc 46 is a toothed wheel 48 having as many teeth as there are setting holes, eleven in the case shown. The extreme left end of finger 23 is provided with a catch 49 which holds stiff with finger 23 when said finger swings down against a tooth of wheel 48, but gives when said finger is raised to pass the tooth above it. This catch acts like catch 22 described before.

In operating the machine pointer 43 is set at the position desired for the number of batches and shaft 39 is pushed inward carrying disc 44 in with it until pin 45 passes through a setting hole 47 and projects to the rear. For example if six batches were wanted, disc 44 would be turned until pointer 43 was opposite the fifth setting hole from the top one (see Fig. 1). Shaft 39 is then pushed inward until pin 45 passes through this fifth hole. This means that finger 23 must push down five teeth on wheel 48 before pin 45 is carried to its topmost position. Finger 23 pushes down a tooth everytime hopper 14 fills with hot water and tilts down to discharge. When pin 45 is in its top most position, as finger 23 presses down the fifth tooth, pin 45 (Fig. 7) is brought against the upper leg of lever 36, causing the lower leg to be lowered and moving top 38 below catch 22. This permits catch 22 and rod 24 to rotate under the influence of spring 27 to its initial position (solid lines Fig. 8).

This will hold down finger 23 and with it hopper 14 at the next discharge of hopper 14, the sixth discharge in this case. This cuts off the steam and hot water supply through linkage 18, 19, 20 and valves 16 and 17.

After the index has been set for the number of batches desired, container 8 is screwed on with a fresh supply of coffee grounds. As the container 8 is screwed on catch 29 comes against projection 28 of rod 24 and turns the latter so that catch 22 is rotated clear of finger 23 (dotted position Fig. 8) pressing down the hemispherical top 38 as it passes over it. With finger 23 clear of catch 22, hopper 14 assumes its horizontal or normal position by gravity (dotted position Fig. 1). This opens up the steam and hot water supply valves by means of linkage 18, 19 and 20. Hot water now flows into hopper 14 through pipe 12, until the load of water causes the hopper to tilt down and discharge through the coffee grounds and into receptacle 31. As hopper 14 tilts down, finger 23 strikes a tooth of wheel 48 and turns it the distance between one setting hole. Hopper 14 being now empty returns to its upper position by gravity and is again filled with hot water and tilts down once more. This continues until toothed wheel 48 is turned sufficiently to bring pin 45 against the upper arm of lever 36 for releasing catch 22 to its position for holding down finger 23.

The amount hopper 14 can tilt down is limited by the linkage 18, 19 and 20 and the rotation of shaft 21 which can only turn until valves 16 and 17 are closed.

I claim:

1. A coffee brewing machine comprising a casing, a hopper pivotally mounted in said casing, said hopper when empty having its center of gravity to one side of its pivotal axis and with a predetermined amount of water in it the combined center of gravity of the hopper and its contents being on the opposite side of said axis, a valve for controlling the supply of steam to said casing, another valve for controlling the supply of hot water to said hopper, and means connecting said hopper with said valves whereby the latter are actuated in accordance with the tilting of said hopper about its axis as determined by the shifting of the center of gravity.

2. A coffee brewing machine comprising a casing, a container for holding coffee grounds removably fastened to said casing, a hopper pivotally mounted in said casing, means for supplying water to said hopper, said hopper adapted to hold a predetermined quantity of water when standing in its normal position, and when said quantity is exceeded to tilt about its pivotal axis into another position to discharge its contents for wetting the coffee grounds, means adapted automatically to lock said hopper against return to its normal position after it has been tilted into its discharge position, and means upon said container adapted to trip said locking means for releasing said hopper to normal position as said container is fastened upon the casing.

3. A coffee brewing machine comprising a casing, a container for holding coffee grounds removably fastened to said casing, a hopper movably mounted in said casing for supplying a measured quantity of water to said container when moved to discharging position from its normal position, means for automatically locking said hopper against return to its normal position after it has been moved to discharging position, and means actuated by said container adapted to trip said locking means for releasing said hopper to normal position as said container is fastened upon the casing.

4. A coffee brewing machine comprising a casing, a container for holding coffee grounds removably fastened to said casing, a hopper movably mounted in said casing for supplying a measured quantity of water to said container when moved to discharging position from its normal position, means for automatically locking said hopper against return to its normal position after it has been moved to discharging position, and means actuated by said container to trip said locking means for releasing said hopper to normal position as said container is fastened upon the casing.

5. A coffee brewing machine comprising a casing, a container for holding coffee grounds fastened to the casing by rotating said container upon the casing in a predetermined direction, a hopper movably mounted in said casing for supply a measured quantity of water to said container when moved to discharge position from its normal position, and means, rotatably mounted in said casing, normally held in position to lock said hopper against return to its normal position after it has been moved to discharging position, said container having provision to rotate said locking means from its normal position to release said hopper to normal position as said container is rotated for fastening it on the casing.

6. A coffee brewing machine comprising a casing, a container for holding coffee grounds removably fastened to said casing, a hopper having an extending finger, said hopper movably mounted in said casing for supplying a measured quantity of water to said container when moved to discharging position from its normal position, and means for automatically locking said hopper against return to its normal position after it has been moved to discharging position, said means comprising a substantially vertical shank rotatably mounted in the casing and a catch pivotally mounted on the shank near its upper end, said catch being normally spring held in its uppermost position and rotatable downward by said hopper finger when said hopper moves to discharging position, said hopper finger lodging below and held down by said catch when said hopper has reached discharging position, said container having provision to rotate said shank with its catch to release said hopper finger as said container is fastened upon the casing.

7. A coffee brewing machine comprising a casing, a container for holding coffee grounds removably fastened to said casing and in communication therewith, a hopper movably mounted in said casing adapted to hold a predetermined amount of water when standing in its normal position and when said quantity is exceeded to assume another position for discharging its contents to wet the coffee grounds, a valve for controlling the supply of hot water to said hopper, a valve for controlling the supply of steam to said casing, mechanism connecting said valves with the hopper adapted to have the valves open when the hopper is in its normal position and to have the valves closed when the hopper is in its latter or discharge position, means adapted automatically to lock said hopper against return to its normal position after it has been moved into its discharge position, and means actuated by said container adapted to trip said locking means for releasing said hopper to its normal position as said container is fastened upon the casing.

8. A coffee brewing machine comprising a casing, a container for holding coffee grounds removably fastened to said casing, a hopper movably mounted in said casing for supplying a measured quantity of water to said container each time when moved to discharging position from its normal position, means for automatically locking said hopper against return to its normal position after it has been moved to discharging position a predetermined number of times, and means actuated by said container to trip said locking means for releasing said hopper to normal position as said container is fastened upon the casing.

9. A coffee brewing machine comprising a casing, a container for holding coffee grounds removably fastened to said casing, a hopper pivotally mounted in said casing, means for supplying water to said hopper, said hopper when standing in its normal position adapted to hold a predetermined quantity of water and when said quantity is exceeded to tilt about its pivotal axis into another position to discharge its contents for wetting the coffee grounds, means for automatically locking said hopper against return to its normal position after it has been tilted into its discharge position a predetermined number of times, said locking means being adjustably set to vary said number of times, a predetermined number corresponding in each setting, and means actuated by said container to trip said locking means for releasing said hopper to normal position as said container is fastened upon the casing.

10. A coffee brewing machine comprising a casing, a container for holding coffee grounds removably fastened to said casing, a hopper movably mounted in said casing adapted to hold a predetermined amount of water when standing in its normal position and when said quantity is exceeded to assume another position for discharging its contents to wet the coffee grounds, a valve for controlling the supply of hot water to said hopper, a valve for controlling the supply of steam to said coffee grounds, mechanism connecting said valves with the hopper adapted to have the valves open when the hopper is in its normal position and to have the valves closed when the hopper is in its latter or discharge position, means for automatically locking said hopper against return to its normal position after it has been moved into discharge position a predetermined number of times, said locking means being adjustably set to vary said number of times, a predetermined number corresponding to each setting, and means actuated by said container to trip said locking means for releasing said hopper to its normal position as said container is fastened upon the casing.

11. A coffee brewing machine comprising a movably mounted hopper for supplying a measured quantity of water each time when moved to discharging position from its normal position, means for automatically locking said hopper against return to its normal position after it has moved to discharging position and mechanism for preventing said locking until said hopper has moved into discharging position a predetermined number of times, said mechanism comprising a rotatably mounted manually settable index member adapted to be given a partial revolution each time said hopper discharges, said member effecting the positioning of said locking means to lock said hopper in discharge position after it has discharged a predetermined number of times, the position in which said index member is set determining said number of times.

12. A coffee brewing machine comprising a casing, a hopper movably mounted in said casing, said hopper when empty being in one position, and with a predetermined amount of water in it being moved to a discharging position, a valve for controlling the supply of steam to said casing, another valve for controlling the supply of hot water to said hopper, means connecting said hopper with said valves whereby the latter are actuated in accordance with the motion of the hopper as determined by the amount of water in it, and a container for holding coffee grounds having said grounds steamed by the steam entering the casing and wet by the water discharged from the hopper.

13. A coffee brewing machine comprising a casing, a hopper movably mounted in said casing, said hopper when empty normally setting in one position and when filled with a predetermined amount of water being moved from normal position to a discharging position, means for controlling a supply of hot water to said hopper, said means being actuated in accordance with the motion of the hopper as determined by the amount of water in it, the supply of hot water being cut off when the hopper moves into discharging position, automatic means for locking said hopper in discharging position when moved to said position, and a container for holding coffee grounds having said grounds wet by the water discharged from the hopper.

STEPHEN MEZZAPESA.